United States Patent
Forutanpour et al.

(10) Patent No.: US 9,986,075 B2
(45) Date of Patent: May 29, 2018

(54) MOBILE DEVICE INCLUDING A SUBSTANTIALLY CENTRALLY LOCATED EARPIECE

(71) Applicant: QUALCOMM Incorporated, San Diego, CA (US)

(72) Inventors: Babak Forutanpour, Carlsbad, CA (US); Andre Gustavo Pucci Schevciw, San Diego, CA (US); Daniel Scott Baker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 142 days.

(21) Appl. No.: 14/296,330

(22) Filed: Jun. 4, 2014

(65) Prior Publication Data
US 2015/0358445 A1 Dec. 10, 2015

(51) Int. Cl.
| H04M 1/00 | (2006.01) |
| H04M 1/03 | (2006.01) |
| G06F 1/16 | (2006.01) |
| H04M 1/67 | (2006.01) |
| H04M 1/725 | (2006.01) |

(52) U.S. Cl.
CPC .......... *H04M 1/035* (2013.01); *G06F 1/1626* (2013.01); *G06F 1/1688* (2013.01); *H04M 1/03* (2013.01); *H04M 1/67* (2013.01); *H04M 1/72569* (2013.01); *H04M 2250/12* (2013.01); *H04M 2250/22* (2013.01)

(58) Field of Classification Search
CPC .......... H04R 3/02; H04R 1/1075; H04R 1/02; H04R 5/033
See application file for complete search history.

(56) References Cited

U.S. PATENT DOCUMENTS

| 5,884,156 | A | 3/1999 | Gordon |
| 6,044,153 | A | 3/2000 | Kaschke |
| 7,103,395 | B2 | 9/2006 | Mori |
| 7,565,178 | B1* | 7/2009 | Sitachitt ............... H04M 1/035 379/430 |
| 7,844,288 | B2 | 11/2010 | Bayne |
| 8,032,337 | B2 | 10/2011 | Deichmann et al. |
| 8,812,320 | B1* | 8/2014 | Roblek .................. G10L 17/24 704/246 |
| 2004/0048641 | A1 | 3/2004 | Dufosse et al. |
| 2005/0107046 | A1 | 5/2005 | Desbarats et al. |
| 2005/0250553 | A1* | 11/2005 | Lim ..................... H04M 1/605 455/569.1 |

(Continued)

FOREIGN PATENT DOCUMENTS

| WO | 2008097722 A1 | 8/2008 | |
| WO | WO 2014077284 A1 * | 5/2014 | ............. H04M 1/67 |

OTHER PUBLICATIONS

International Search Report and Written Opinion for International Application No. PCT/US2015/029935, ISA/EPO, dated Nov. 11, 2015, 24 pages.

*Primary Examiner* — Mohammed Rachedine (57) ABSTRACT

A mobile device includes a housing. The mobile device further includes a first earpiece accessible via a first aperture in a first side of the housing. The mobile device further includes a second earpiece accessible via a second aperture in a second side of the housing, where the second aperture is located substantially in the center of the second side.

29 Claims, 10 Drawing Sheets

(56) References Cited

U.S. PATENT DOCUMENTS

| | | | |
|---|---|---|---|
| 2007/0232325 A1* | 10/2007 | Oshime | H04M 1/72522 |
| | | | 455/456.1 |
| 2009/0036100 A1 | 2/2009 | Lee | |
| 2011/0319128 A1* | 12/2011 | Miwa | H04M 1/6008 |
| | | | 455/550.1 |
| 2012/0182429 A1* | 7/2012 | Forutanpour | H04R 3/005 |
| | | | 348/175 |
| 2012/0231778 A1* | 9/2012 | Chen | G01S 11/14 |
| | | | 455/418 |
| 2013/0207905 A1 | 8/2013 | Hankins et al. | |
| 2013/0285925 A1* | 10/2013 | Stokes | G06F 3/04883 |
| | | | 345/173 |
| 2014/0024356 A1* | 1/2014 | Yoon | H04W 8/22 |
| | | | 455/418 |
| 2014/0141755 A1* | 5/2014 | Dwarkaprasad | H04W 76/00 |
| | | | 455/414.1 |
| 2014/0310643 A1* | 10/2014 | Karmanenko | G06F 1/1626 |
| | | | 715/784 |
| 2014/0328491 A1* | 11/2014 | Slotte | H04R 1/2811 |
| | | | 381/74 |
| 2015/0074615 A1* | 3/2015 | Han | G06K 9/00033 |
| | | | 715/863 |
| 2015/0189178 A1* | 7/2015 | Lombardi | H04N 5/232 |
| | | | 348/207.99 |

* cited by examiner

MOBILE DEVICE INCLUDING A SUBSTANTIALLY CENTRALLY LOCATED EARPIECE

I. FIELD

The present disclosure is generally related to a mobile device that includes a substantially centrally located earpiece.

II. DESCRIPTION OF RELATED ART

Advances in technology have resulted in smaller and more powerful computing devices. For example, there currently exist a variety of portable personal computing devices (i.e., mobile devices), including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Portable wireless telephones enable users to communicate with other users and/or computer networks from a variety of locations. For example, a first wireless telephone device may communicate with a second wireless telephone. However, when one or both of the first wireless telephone and the wireless telephone device are located in a noisy environment, audio communication between users of the first wireless telephone and the second wireless telephone may be difficult. Active noise cancelation may reduce background noise received from a wireless telephone located in a noisy environment. For example, if the first wireless telephone is located in a noisy environment, active noise cancelation may reduce background noise received at the second wireless telephone from the first mobile device. However, active noise cancelation may not reduce the difficulty the first user experiences in hearing signals from the second wireless telephone due to the noisy environment of the first wireless telephone.

III. SUMMARY

An apparatus and method of improving sound quality in a variety of environments are disclosed. For example, a mobile device may include a first earpiece and a second earpiece. The first earpiece may be accessible via a first (e.g., front) side of a housing of the mobile device, and the second earpiece may be accessible via a second side of the housing (e.g., on the back of the mobile device). The second earpiece may be located substantially in the center of the second side. The location of the second earpiece may enable the second side of the housing to cover an entirety of a user's ear when the second earpiece is in use. Covering the user's ear (by using the second earpiece and the second side) may form a more complete seal (as compared to use of the first earpiece) to reduce background noise experienced by the user.

Initially, the mobile device may output sound via the first earpiece. Upon detecting a particular movement of the mobile device (e.g., a rotation of the mobile device about an axis parallel to one or both of the first side and the second side), the mobile device may cease outputting sound via the first earpiece and begin outputting sound via the second earpiece. For example, during a call, a user may experience background noise associated with the user's location. The user may "flip" the mobile device over to use the second earpiece. The mobile device may detect the flip, cease outputting sound via the first earpiece, and begin outputting sound via the second earpiece. The mobile device may further lock a touchscreen interface of the mobile device in response to detecting the flip. The flip may be detected using a gyroscope, an accelerometer, an infrared sensor, a camera (s), or a combination thereof.

In a particular embodiment, a mobile device includes a housing. The mobile device includes a first earpiece accessible via a first aperture in a first side of the housing. The mobile device further includes a second earpiece accessible via a second aperture in a second side of the housing; the second aperture is located substantially in the center of the second side.

In another particular embodiment, a method includes outputting, at a mobile device, sound via a first earpiece accessible via a first side of a housing of the mobile device. The method further includes, based on detected input, ceasing output of sound via the first earpiece and outputting sound via a second earpiece accessible via a second side of the housing, where the second side is opposite the first side, and where the second earpiece is located substantially in the center of the second side.

In another particular embodiment, a computer readable storage device is disclosed. The computer readable storage device stores instructions that, when executed by a processor, cause the processor to perform operations including outputting, at a mobile device, sound via a first earpiece accessible via a first side of a housing of the mobile device. The operations further include, based on detected input, ceasing output of sound via the first earpiece and outputting sound via a second earpiece accessible via a second side of the housing, where the second side is opposite the first side, and where the second earpiece is located substantially in the center of the second side.

Other aspects, advantages, and features of the present disclosure will become apparent after review of the entire application, including the following sections: Brief Description of the Drawings, Detailed Description, and the Claims.

V. DETAILED DESCRIPTION

Figure 1:
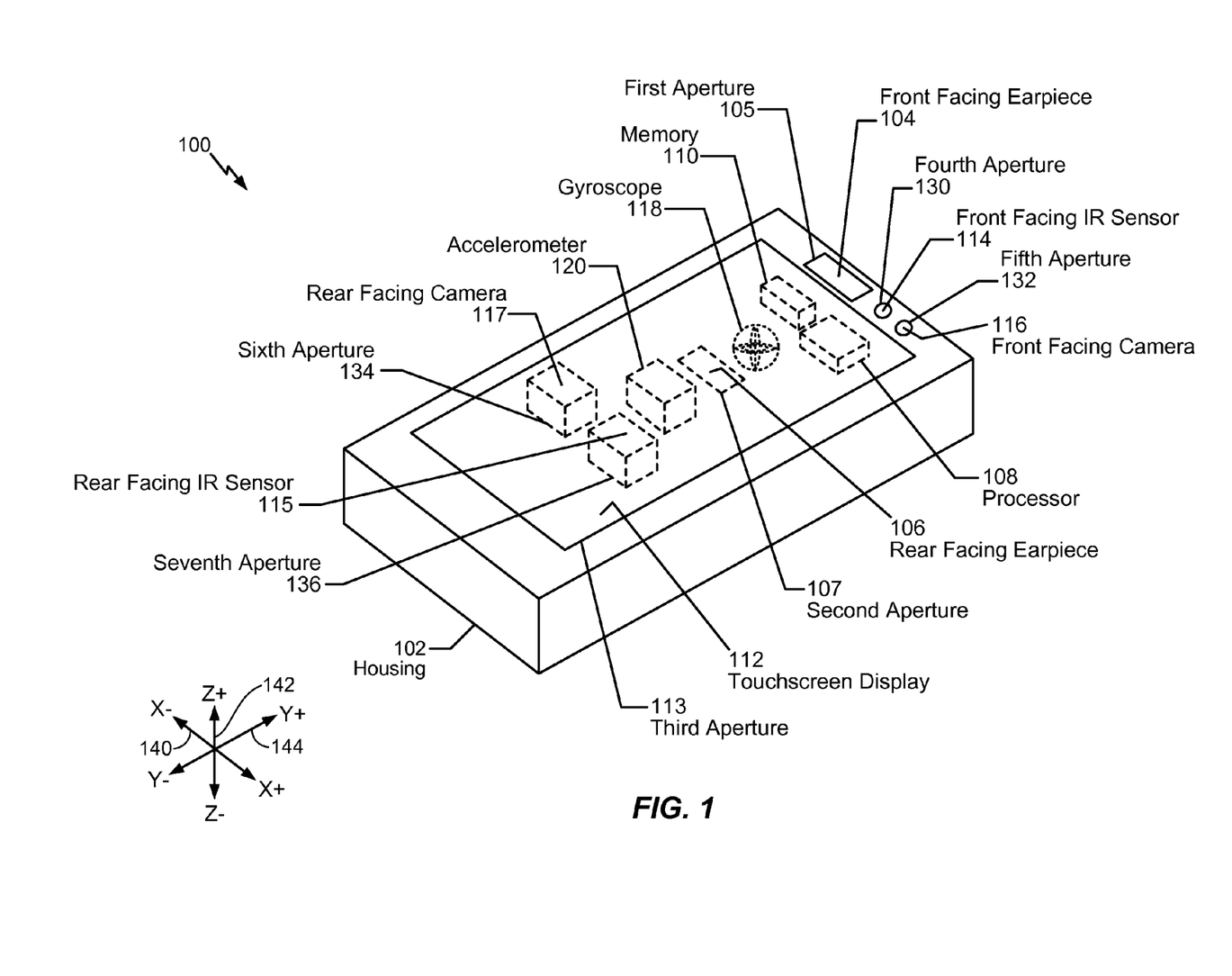
FIG. 1 is a diagram of a particular illustrative embodiment of a mobile device including a substantially centrally located earpiece.

Referring to FIG. 1, a particular illustrative embodiment of a mobile device 100 is disclosed. In the illustrated example, the mobile device 100 includes a housing 102. The housing 102 contains components of the mobile device 100. Various components are accessible by or have access to the world outside of the mobile device via apertures (e.g., holes) in the housing 102. For example, the mobile device 100 includes a front facing earpiece 104 (e.g., a first earpiece). A first aperture 105 in the housing 102 may enable the front facing earpiece 104 to output audio to a human ear outside of the housing 102. As a further example, a second aperture 107 may enable a rear facing earpiece 106 (e.g., a second earpiece) to output audio to a human ear outside of the housing 102. Further, a third aperture 113 may enable a user to view and interact with a touchscreen display 112. In the illustrated embodiment, the first aperture 105 and the third aperture 113 are collocated on a first side of the housing 102 and the second aperture 107 is located on a second side of the housing 102. In the illustrated example, the first side and the second side are opposite to (e.g., facing or positioned on the far side of the mobile device 100 from) each other.

The mobile device 100 further includes a plurality of sensors. For example, the mobile device 100 includes a front facing infrared (IR) sensor 114 (e.g., a proximity sensor), a rear facing IR sensor 115 (e.g., a proximity sensor), a front facing camera 116, a rear facing camera 117, a gyroscope 118, and an accelerometer 120. Different embodiments may include more, or fewer, sensors. Further, various sensors of the plurality of sensors may detect conditions outside of the mobile device via apertures in the housing 102. For example, the front facing IR sensor 114 and the rear facing IR sensor 115 may transmit and detect infrared light via the apertures 130 and 136, respectively. The front facing camera 116 and the rear facing camera 117 may capture light via apertures 132 and 134, respectively. The fourth aperture 130 and the fifth aperture 132 may be collocated with the first aperture 105 and the third aperture 113 on the first side of the housing 102. The sixth aperture 134 and the seventh aperture 136 may be collocated with the second aperture 107 on the second side of the housing 102.

The gyroscope 118 may detect rotation of the mobile device 100 about an X axis 140, a Z axis 142, a Y axis 144, or a combination thereof. The accelerometer 120 may detect acceleration of the mobile device 100 parallel to the X axis 140, the Z axis 142, the Y axis 144, or a combination thereof. Output from the accelerometer 120, the gyroscope 118, or both may be used to determine rotation about one or more of the X axis 140, the Z axis 142, and the Y axis 144.

The mobile device further includes a processor 108 and a memory 110. The memory 110 may store instructions and data executable by and accessible to the processor 108. The processor 108 may control various functions of the mobile device 100 according to the instructions and based on inputs received by the touchscreen display 112 and the plurality of sensors. For example, the processor 108 may control output of sound via the front facing earpiece 104 and the rear facing earpiece 106 based on a detected orientation of the front facing earpiece 104 and/or the rear facing earpiece 106 relative to a user. It should be noted that the locations of the components shown in FIG. 1, other than the rear facing earpiece 106, are examples only.

Figure 3:
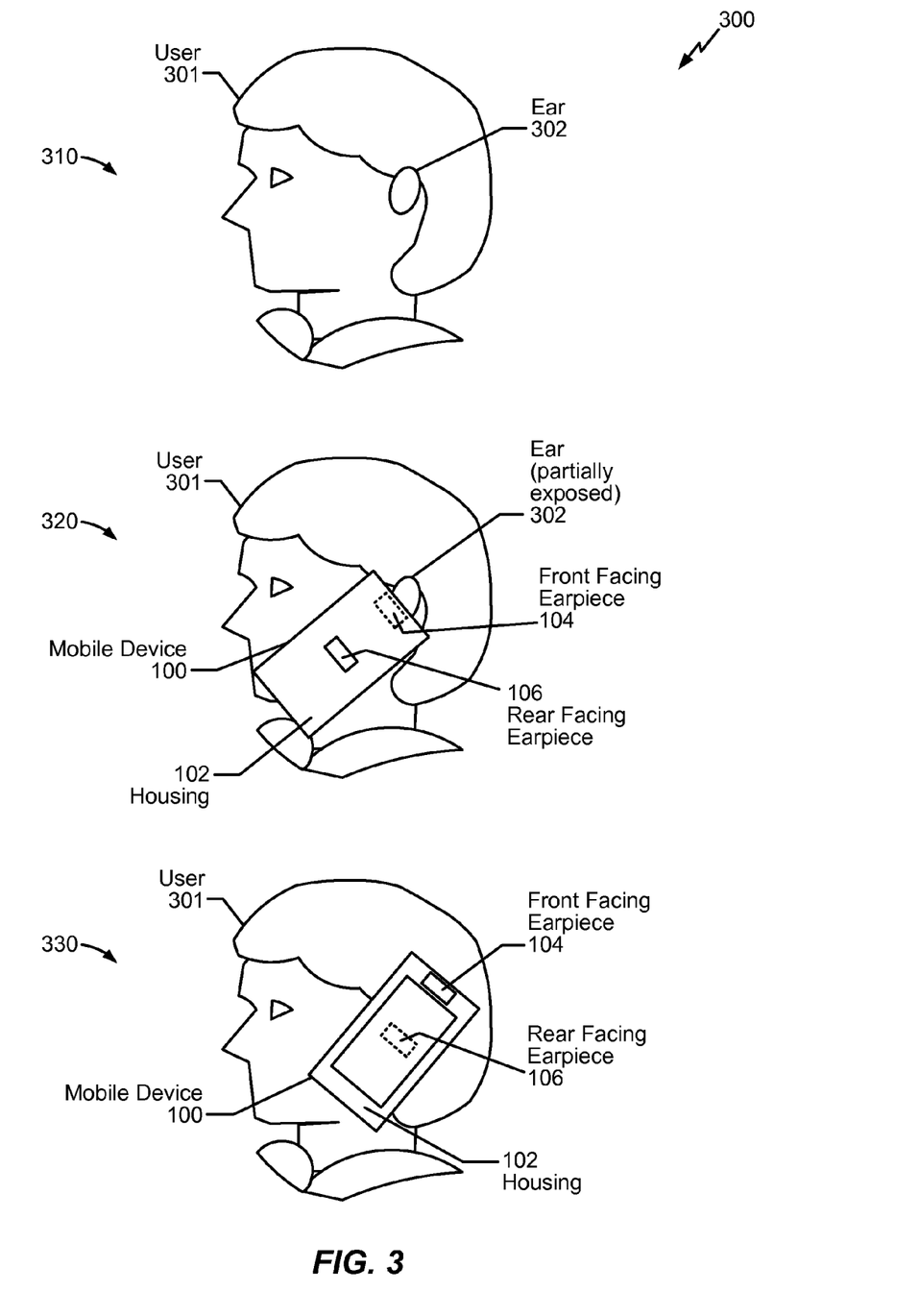
FIG. 3 is a diagram illustrating use of the mobile device of FIG. 1.

In operation, the mobile device 100 may support audio communication with another device (e.g., another mobile device). For example, a first user may use the mobile device 100 to engage in a telephone conversation with a second user of the other device. During audio communication, the mobile device 100 may output sound via one of the earpieces 104 and 106. When the mobile device 100 outputs sound via the front facing earpiece 104, the user may hold the mobile device 100 up to his or her ear so that the front facing earpiece 104 is in contact or in close proximity with the ear in order for the user to hear the output sound. However, due to a first location (e.g., at a periphery of the first side) of the first aperture 105 in the housing 102, the housing 102 may form an incomplete seal with the ear when the front facing earpiece 104 is in use. That is, part of the ear may be exposed to open air because the housing 102 may not overlap the entire ear, as shown below in FIG. 3. The first aperture 105 and the front facing earpiece 104 may be located at the first location to accommodate the touchscreen display 112. While the mobile device 100 outputs sound via the rear facing earpiece 106, the user may hold the mobile device 100 up to his or her ear so that the rear facing earpiece 106 is in contact or in close proximity with the ear in order for the user to hear the output sound. Due to a second location (e.g., substantially in the center of the second side) of the second aperture 107 and the rear facing earpiece 106, the housing 102 may form a more complete seal with the ear when the rear facing earpiece 106 is in use, as shown in FIG. 3. That is, the housing 102 may overlap the entire ear forming a more complete seal and enabling improved hearing in noisy environments. Therefore, it may be beneficial for the mobile device 100 to output sound via the rear facing earpiece 106 when the user of the mobile device 100 is in a noisy environment.

The processor 108 may control which of the earpieces 104 and 106 outputs sound based on instructions stored in the memory 110 and input received from one or more of the sensors, from the touchscreen display 112, or from a combination thereof. In a particular embodiment, the processor 108 may detect a noisy environment via audio input received at a microphone (not shown). In response to detecting the noisy environment, the processor 108 may prompt a user to switch to using the rear facing earpiece 106, may automatically output sound via the rear facing earpiece 106, or both. In some embodiments, the processor 108 switches from outputting sound via the front facing earpiece 104 to the rear facing earpiece 106 based on input (e.g., selection of a button or a switch to toggle earpieces) received via a graphical user interface (GUI) displayed at the touchscreen display 112.

In some examples, the processor 108 may select one of the earpieces 104 or 106 for sound output based on a detected orientation of the front facing earpiece 104 and the rear facing earpiece 106 relative to the user. For example, upon beginning an audio communication (e.g., a phone call), the processor 108 may cause sound to be output via the front facing earpiece 104. In some examples, the processor 108 may further save state information indicating that the front facing earpiece 104 is facing the user (and the rear facing earpiece 106 is facing away from the user) and/or that sound is being output via the front facing earpiece 104.

During the audio communication, the processor 108 may detect a change in orientation of the front facing earpiece 104 and the rear facing earpiece 106 relative to the user. In some examples, the processor 108 may detect a rotation of the mobile device 100. For example, the processor 108 may receive input from the gyroscope 118 and/or the accelerometer 120 indicating that the mobile device 100 has been rotated about the X axis 140, the Z axis 142, the Y axis 144, or a combination thereof. In particular examples, the processor 108 periodically polls the gyroscope 118 and/or the accelerometer 120 for the input. Alternately, the gyroscope 118 and the accelerometer 120 "push" updated sensor data to the processor 108 when the mobile device 100 is moved. The processor 108 may determine that the change in orientation has occurred based on detecting a rotation about an axis (e.g., the Y axis 144). In other examples, the processor 108 may determine that the change in orientation occurred in response to detecting rotation about two axes (e.g., the Y axis 144 and the Z axis 142).

In some examples, the processor 108 may detect a change in orientation based on input received from one or more of the front facing camera 116, the front facing IR sensor 114, the rear facing IR sensor 115, and the rear facing camera 117. For example, the IR sensors 114 and 115 may be configured to detect proximity to objects. The processor 108 may poll or receive push data from the IR sensors 114 and 115 periodically to determine whether an object (e.g., the head of the user) is within a proximity of the front facing IR sensor 114 or the rear facing IR sensor 115. In one example, the processor 108 detects the change in orientation based on detecting that the front facing IR sensor 114 is not within a proximity threshold of an object and that the rear facing IR sensor 115 is within the proximity threshold of an object. In other examples, the processor 108 may detect the change in orientation based on detecting that the front facing IR sensor 114 is not within the proximity threshold of an object. As an additional example, the processor 108 may be configured to detect proximity of objects in images captured by the cameras 116 and 117. The processor 108 may detect the change in orientation based on images captured by one or both of the cameras 116 and 117. In one example, the processor 108 detects the change in orientation based on detecting that the front facing camera 116 is not within the proximity threshold of an object and that the rear facing camera 117 is within the proximity threshold of an object. In other examples, the processor 108 may detect the change in orientation based on input from a single camera, such as based on detecting that the front facing camera 116 is not within the proximity threshold of an object.

When the processor 108 detects the change in orientation, the processor 108 may determine which of the earpieces 104 and 106 is in use based on the state stored in the memory 110. When the front facing earpiece 104 is in use, the processor 108 may silence the front facing earpiece 104 and begin outputting sound via the rear facing earpiece 106. In addition, the processor 108 may lock the touchscreen display 112 and/or turn off the touchscreen display 112. In some examples, the touchscreen display 112 is associated with an unlock gesture (e.g., an input pattern received via the touchscreen display 112 that causes the processor 108 to unlock the touchscreen display 112, such as a "swipe"). The processor 108 may change the unlock gesture (e.g., disable recognition of the unlock gesture and enable recognition of a different unlock gesture with a higher degree of complexity than the unlock gesture) in response to detecting the change in orientation, as described in more detail below. For example, when sound is output via the front facing earpiece 104, the processor 108 may unlock the touchscreen display 112 in response to a first unlock gesture, such as a horizontal or vertical swipe on the touchscreen display 112. When sound is output via the rear facing earpiece 106, the processor 108 may refrain from unlocking the touchscreen display 112 unless a second, more complex, unlock gesture is detected. The processor 108 may make the touchscreen display 112 more difficult to unlock when sound is output via the rear earpiece 106 due to an increased likelihood of a user accidentally unlocking the touchscreen display 112 with his or her hand. Examples of unlock gestures are further described with reference to FIG. 6. In a particular embodiment, the processor 108 updates the state stored in the memory 110 (e.g., to indicate that the rear earpiece 106 faces the user and the front earpiece 104 faces away from the user) in response to detecting the change in orientation of the mobile device 100 after changing from outputting sound via the front facing earpiece 104 to outputting sound via the rear facing earpiece 106. The processor 108 may further disable the front facing IR sensor 114 when sound is output via the rear facing earpiece 106.

When the mobile device 100 is rotated back to its initial position (e.g., the front facing earpiece 106 facing the user), the processor 108 may unlock the touchscreen display 112 and/or silence the rear facing earpiece 106 and begin outputting sound via the front facing earpiece 104. Further, the processor 108 may re-enable the unchanged unlock gesture (i.e., the processor 108 may unlock the touchscreen display 112 in response to detecting the unchanged unlock gesture while the touchscreen display 112 is locked) and update the state stored in the memory 110 (e.g., to indicate that the front facing earpiece 104 faces the user and the rear facing earpiece 106 faces away from the user).

In addition or in the alternative to switching back to the front facing earpiece 104 upon detecting the rotation back to the initial position, the processor 108 may unlock the touchscreen display 112 and/or silence the rear facing earpiece 106 and begin outputting sound via the front facing earpiece 104 in response to detecting the changed unlock gesture. Further, the processor 108 may re-enable the first (e.g., less complex) unlock gesture to unlock the touchscreen display 112 and update the state stored in the memory 110 (e.g., to indicate that the front facing earpiece 104 faces the user and the rear facing earpiece 106 faces away from the user).

Thus, the mobile device 100 may enable switching sound output between a first front facing earpiece at a first side of the mobile device 100 and a second rear facing earpiece located substantially in the center of a second side of the mobile device 100. The location of the second rear facing earpiece may enable a more efficient or more complete seal to be formed between a user's ear and the mobile device 100. Therefore, by outputting sound via the rear facing earpiece 106, the mobile device 100 may provide improved sound quality in noisy environments.

In some embodiments, the housing 102 may comprise a casing that is removable from the mobile device 100. Alternately, a user may insert the housing 102 into a casing (e.g., a protective casing). The rear facing earpiece 106 may be included as part of the removable casing. For example, when the removable casing is attached to the mobile device 100, the rear facing earpiece 106 may receive audio input via a wired or wireless connection with the mobile device 100. In some examples, the rear facing earpiece 106 is not part of the removable casing, but is removable from and configured to attach to the mobile device 100. For example, the rear facing earpiece 106 may be configured to communicate with the mobile device 100 via a wired or wireless connection and may be configured to attach to the housing 102. The rear facing earpiece 106, the casing, or both may be manufactured (e.g., using three dimensional scanning and/or printing technology) to fit a particular user's ear to form a better seal with the user's ear.

Figure 2:
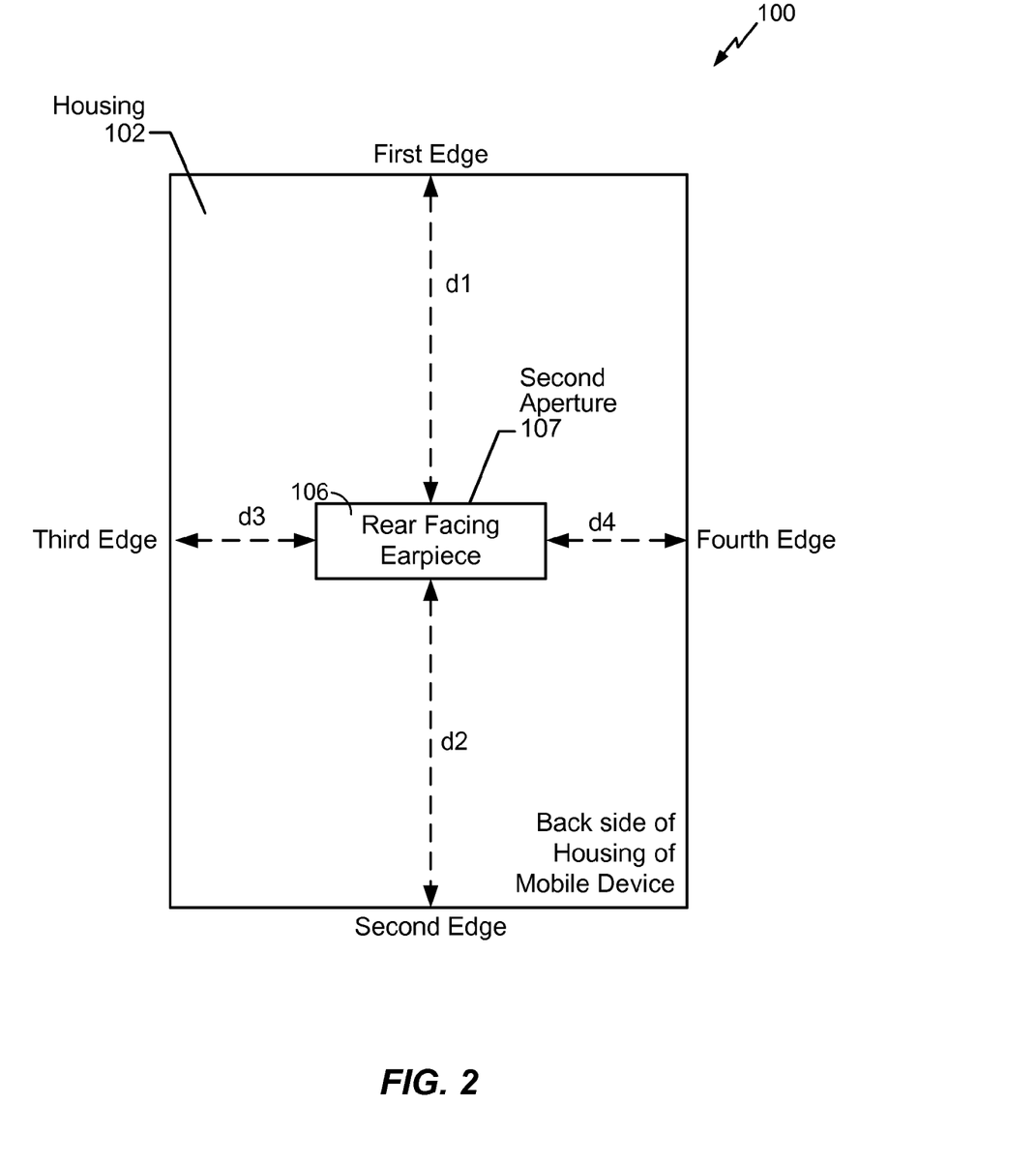
FIG. 2 is another diagram of the mobile device of FIG. 1.

FIG. 2 shows another view of the mobile device 100. In particular, FIG. 2 depicts a location of the rear facing earpiece 106 and the second aperture 107 in the second side (e.g., back side) of the housing 102. The rear facing earpiece 106 and the second aperture 107 may be located so that when the rear facing earpiece 106 is in use, the second side of the housing 102 forms a more complete seal with an ear of a user (e.g., substantially covers the ear). In one example, the rear facing earpiece 106 and the second aperture 107 are located substantially in the center of the second side of the housing 102. For example, a first distance, d1, from a first edge of the second side to the rear facing earpiece 106 may be substantially equal to a second distance, d2, from a second edge of the second side, opposite (e.g., facing or positioned on the far side of the mobile device 100 from) the first edge, to the rear facing earpiece 106. That is, a length of d1 may be approximately equal to a length of d2 (e.g., d1 may be 90-110% as long as d2). Further, a third distance, d3, from a third edge of the second side to the rear facing earpiece 106 may be substantially equal to a fourth distance, d4, from a fourth edge of the second side, opposite (e.g., facing or positioned on the far side of the mobile device 100 from) the third edge, to the rear facing earpiece 106. That is, a length of d3 may be approximately equal to a length of d4 (e.g., d3 may be 90-110% as long as d4).

In some examples, the distances, d1, d2, d3, and d4, may be chosen such that when the rear facing earpiece 106 is centered on an ear canal of an average human ear, the housing 102 substantially covers the average human ear. For example, d1 may not be substantially equal to d2 and/or d3 may not be substantially equal to d4. The distances d1-d4 may vary to support different locations of the rear facing earpiece 107 that result in the housing 102 covering an average human ear. For example, d1 may be chosen so that d1 is greater than or equal to a distance from the ear canal of the average human ear to the top of the ear. D2 may be chosen so that d2 is greater than or equal to a distance from the ear canal of the average human ear to the bottom of the ear. D3 may be chosen so that d3 is greater than or equal to a distance from the ear canal of the average human ear to the left side or the right side of the human ear. D4 may be chosen so that d4 is greater than or equal to a distance from the ear canal of the average human ear to the other of the left or the right side of the human ear. Thus, FIG. 2 illustrates placement of a rear facing earpiece that may be used in noisy environments to provide an improved sound quality.

FIG. 3 shows a diagram 300 illustrating use of the mobile device 100. The diagram 300 shows a user 301, such as the user described above with reference to FIG. 1. In the examples of FIG. 3, the user 301 is left-handed and a left ear 302 of the user is shown, for example, at 310. It should be noted, however, that the described techniques are also applicable to right-handed users. When the mobile device 100 is in a first orientation (e.g., the front earpiece 104 faces the user), the mobile device 100 may output sound via the front earpiece 104, as described above. However, due to placement of the front earpiece 104, the ear 302 may be partially exposed when the front earpiece 104 is in use, as shown at 320. Partial exposure of the ear 302 may enable sound output from the front facing earpiece 104 to escape without being captured by the ear 302. Further, ambient sound, such as sound in a noisy room, may leak into the ear 302 further preventing the user 301 from hearing or understanding the sound output via the front facing earpiece 104.

When the mobile device 100 is in a second orientation (e.g., the rear facing earpiece 106 faces the user), sound may be output via the second earpiece 106, as described above. Due to placement of the rear facing earpiece 106, as described above in reference to FIG. 2, the housing 102 may substantially cover the ear 302, thus forming a seal, as shown at 330. By forming a seal, less sound output from the rear facing earpiece 106 may escape the ear 302 and less ambient noise may enter the ear 302. Thus, switching to outputting sound via the rear facing earpiece 106 may enhance hearing and comprehension of sound output from the mobile device in a noisy environment.

Figure 4:
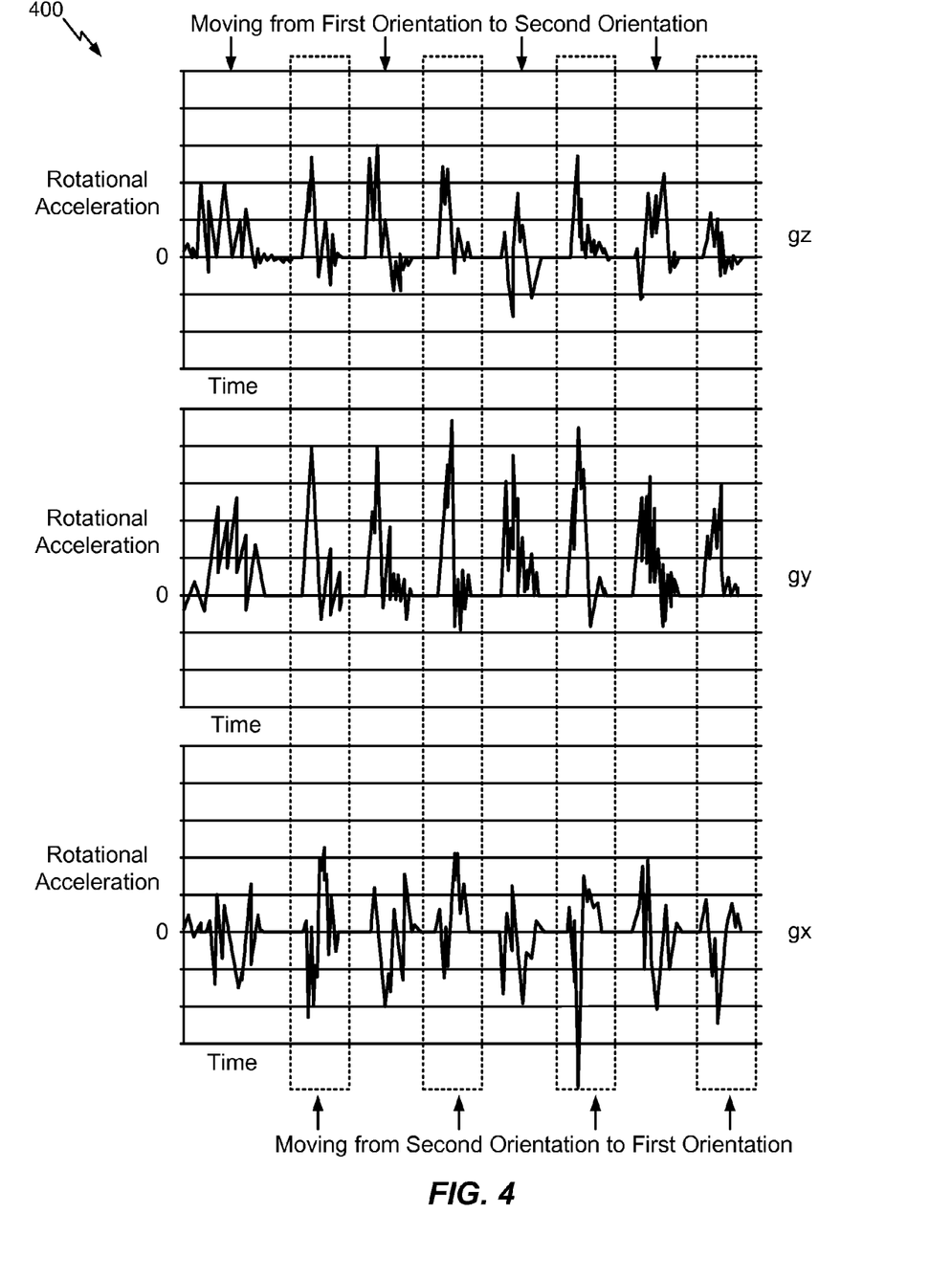
FIG. 4 is a diagram showing data monitored by the mobile device of FIG. 1.

Referring to FIG. 4, a diagram 400 is shown depicting data that may be monitored by a mobile device. The diagram 400 shows 3 graphs, denoted gz, gy, and gx, each of which illustrates data that may be generated by a gyroscope, such as the gyroscope 118 of FIG. 1. In a particular embodiment, the data may be a 3-tuple of the format (A, B, C), where A indicates a number of rotations of a mobile device per second about an X axis, B indicates a number of rotations of the mobile device per second about a Y axis, and C indicates a number of rotations of the mobile device per second about a Z axis.

The graph gz shows rotational acceleration of a mobile device detected about a Z axis of a mobile device, such as the Z axis 142 of the mobile device 100, over a period of time. The graph gy shows rotational acceleration of the mobile device about a Y axis, such as the Y axis 144, over the period of time. The graph gx shows rotational acceleration of the mobile device about an X axis, such as the X axis 140, over the period of time. The data may be used by a processor, such as the processor 108, to detect changes in orientation of the mobile device. As shown in the diagram 400, the rotational acceleration about the Y axis and the Z axis may change rapidly and/or reach relatively high or low magnitudes (e.g., "spike") each time an orientation of the mobile device is changed (e.g., when a user rotates the mobile device to make use of a rear facing earpiece instead of a front facing earpiece, or vice versa). Thus, the processor may monitor rotation about one or both of the Y axis and the Z axis using the gyroscope to detect changes in orientation. Detecting changes in orientation may enable the processor to switch between outputting sound via a front facing earpiece and a rear facing earpiece in response to the changes in orientation.

Figure 5:
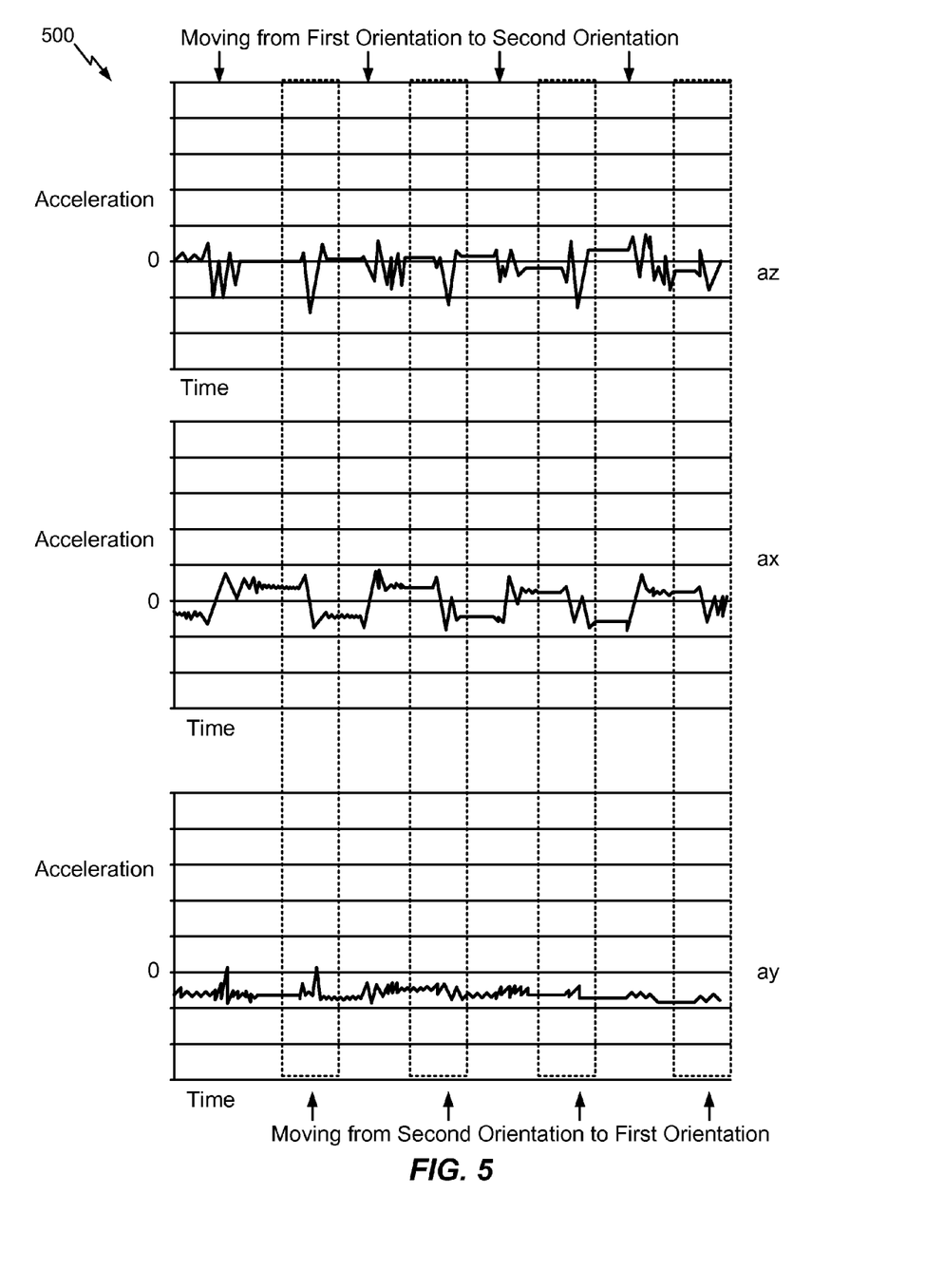
FIG. 5 is another diagram showing data monitored by the mobile device of FIG. 1.

Referring to FIG. 5, another diagram 500 is shown depicting data that may be monitored by a mobile device. The diagram 500 shows 3 graphs, denoted az, ay, and ax, each of which illustrates data that may be generated by an accelerometer, such as the accelerometer 120 of FIG. 1. In a particular embodiment, the data may be a 3-tuple of the format (A,B,C), where A indicates a multiple of acceleration due to gravity along an X axis, B indicates a multiple of acceleration due to gravity along a Y axis, and C indicates a multiple of acceleration due to gravity along a Z axis.

The graph az shows acceleration of a mobile device detected along a Z axis of a mobile device, such as the Z axis 142 of the mobile device 100, over a period of time. The graph ay shows acceleration of the mobile device along a Y axis, such as the Y axis 144, over the period of time. The graph ax shows acceleration of the mobile device along an X axis, such as the X axis 140, over the period of time. The data may be used by a processor, such as the processor 108, to detect changes in orientation of the mobile device. As shown in the diagram 500, the acceleration along the Y axis and the Z axis may change rapidly and/or reach relatively higher or lower magnitudes (e.g., "spike") each time an orientation of the mobile device is changed (e.g., when a user rotates the mobile device to make use of a rear facing earpiece instead of a front facing earpiece, or vice versa). Thus, the processor may monitor acceleration along one or both of the Y axis and the Z axis using the accelerometer to detect changes in orientation. In particular embodiments, the processor may ignore acceleration along the X axis.

Detecting changes in orientation may enable the processor to switch between outputting sound via a front facing earpiece and a rear facing earpiece in response to the changes in orientation (e.g., by changing to which earpiece sound is routed). In a particular embodiment, the processor may use input from both a gyroscope, as in FIG. 4, and an accelerometer, as in FIG. 5, to determine whether a mobile device has been rotated. It should be noted that the graph data in FIGS. 4-5 is an example of data that may be generated when a mobile device is rotated by a left-handed user, such as the user 301 of FIG. 3. When a right-handed user rotates a mobile device, one or more of the gyroscope and/or accelerometer readings may be in the opposite direction (e.g., have an opposite sign). Thus, in selected embodiments, the processor may use the absolute value and/or a rate of change of one or more gyroscope and/or accelerometer readings to determine whether the mobile device has been rotated.

Figure 6:
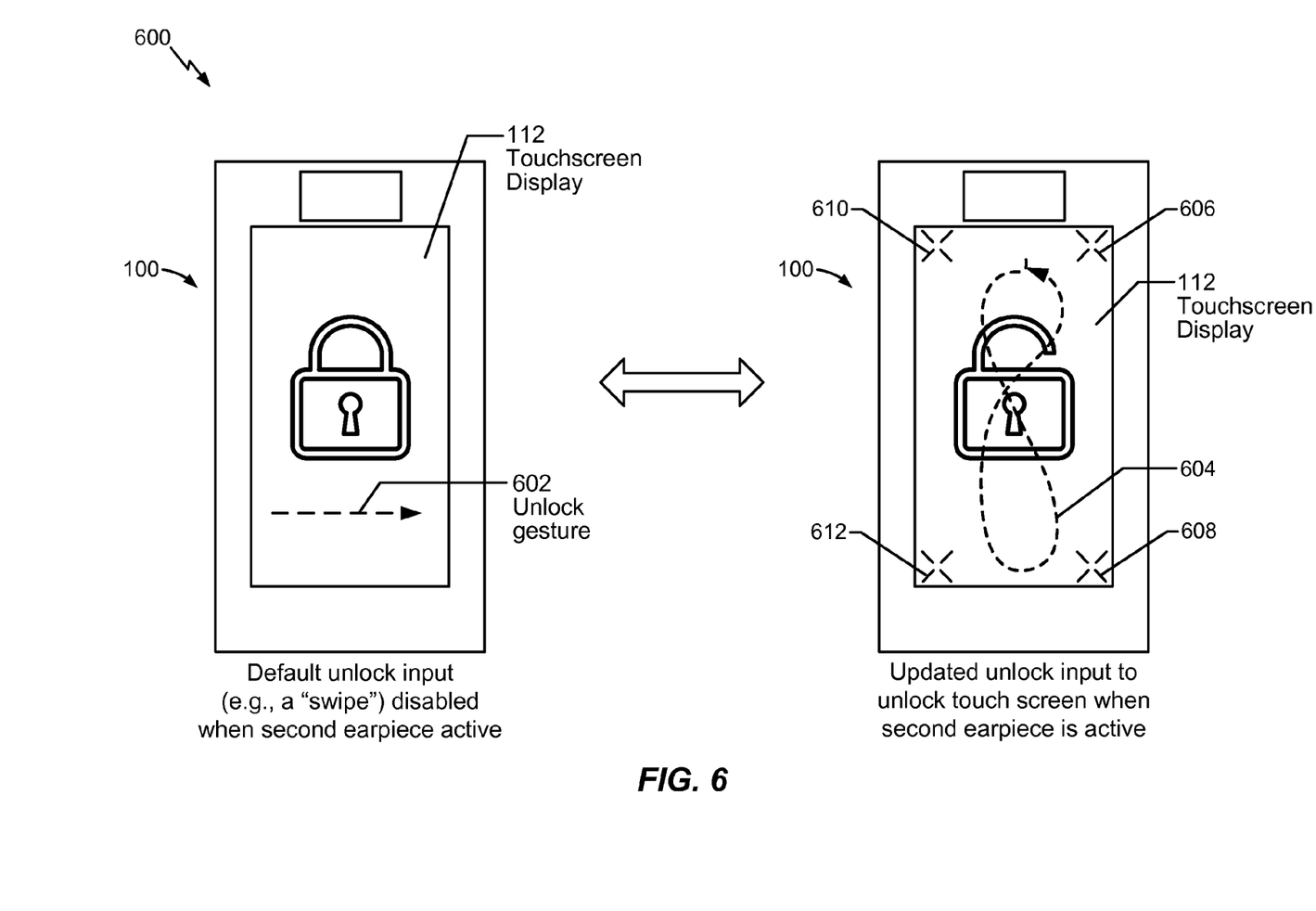
FIG. 6 is another diagram illustrating use of the mobile device of FIG. 1.

Referring to FIG. 6, a diagram 600 illustrates changing an unlock gesture. As described above with reference to FIG. 1, the processor 108 may change an unlock gesture (e.g., an input pattern) associated with unlocking the touchscreen display 112 when the processor 108 ceases outputting sound via one of the earpieces 104, 106 and begins outputting sound via the other of the earpieces 104, 106. For example, when the rear facing earpiece 106 is in use, a hand of a user may be in contact with the touchscreen display 112. The hand of the user may accidentally input the unlock gesture (e.g., a swipe) by rubbing or moving against the touchscreen display 112 while holding the mobile device 100. Changing the unlock gesture to a more complicated gesture may prevent the user from accidentally unlocking the touchscreen display 112 while the rear facing earpiece 106 is in use.

In the example illustrated in the diagram 600, the touchscreen display 112 may be associated with an unlock gesture 602 comprising a "swipe" motion. The unlock gesture 602 may be enabled when the front facing earpiece 104 is in use. The unlock gesture 602 may be disabled when the rear facing earpiece 106 is in use to prevent the user from accidentally unlocking the touchscreen display 112. A more complicated unlock gesture may be associated with the touchscreen display 112 (e.g., by the processor 108) while the rear facing earpiece 106 is in use. The more complicated unlock gesture may have a higher degree of complexity than the unlock gesture 602. Complexity of a particular unlock gesture may be determined by a number of touches, a number of direction changes, or a combination thereof detected in the particular gesture. For example, the diagram 600 shows that the changed unlock gesture includes a "figure 8" gesture 604 and a set of "tap four corners" gestures 606, 608, 610, and 612. In a particular embodiment, the unlock gesture 602 and/or the changed unlock gesture including the gestures 604, 606, 608, 610, and 612 may be chosen by a user. It should be noted that the specific gestures 602-612 illustrated in FIG. 6 are for example only and not to be considered limiting. In alternate embodiments, different unlock gestures may be used. Thus, the diagram 600 illustrates how a likelihood of accidentally unlocking a touchscreen display while using a rear facing earpiece may be reduced.

Figure 7:
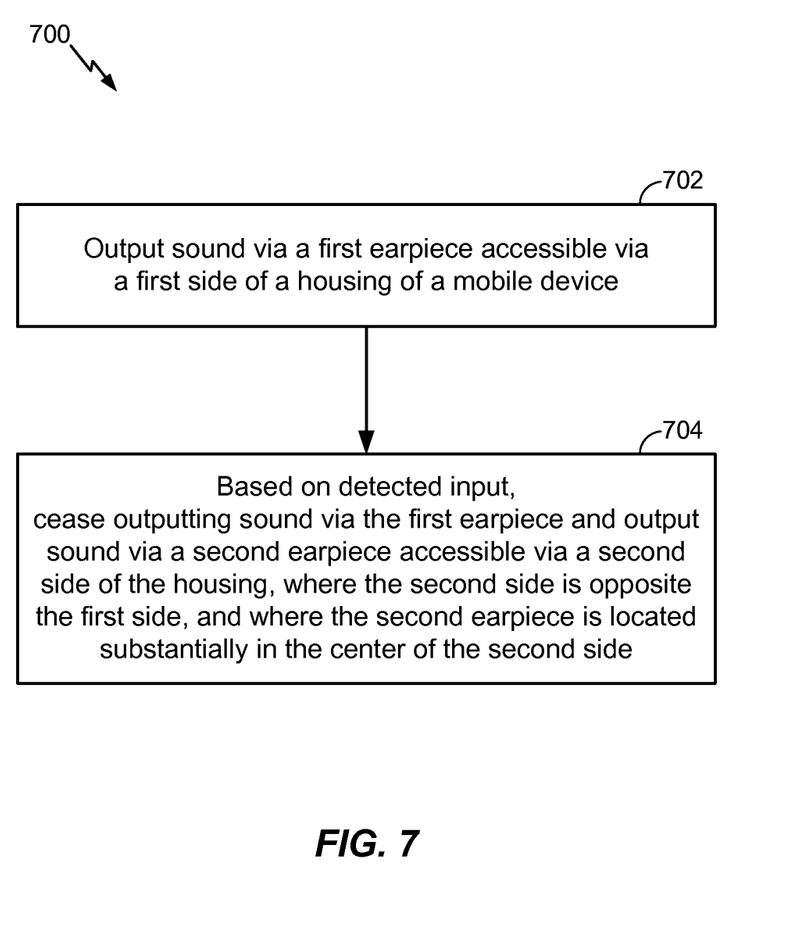
FIG. 7 is a flowchart that illustrates a method of operating a mobile device with improved audio fidelity in loud environments.

FIG. 7 is a flowchart illustrating a method 700 of operating a mobile device with improved audio fidelity in loud environments. The method 700 includes outputting sound via a first earpiece accessible via a first side of a housing of a mobile device, at 702. For example, the processor 108 of the mobile device 100 may cause sound to be output via the front facing earpiece 104 (e.g., a first earpiece) that is accessible via the first aperture 105 in the housing 102. In an illustrative embodiment, the front facing earpiece 104 is a "default" earpiece that is used at the start of a communication (e.g., telephone call).

Figure 8:
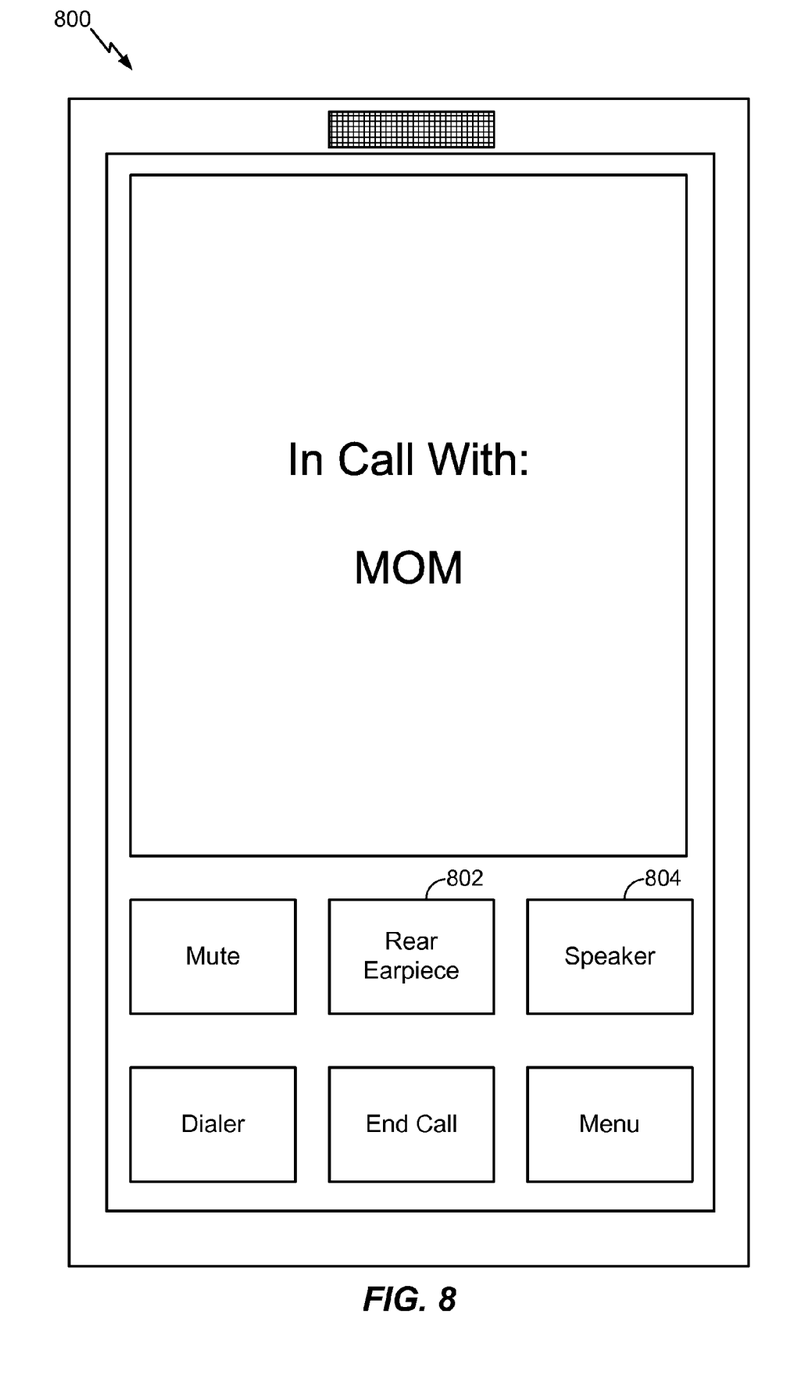
FIG. 8 shows a graphical user interface (GUI) that may be displayed by the mobile device of FIG. 1.
Figure 9:
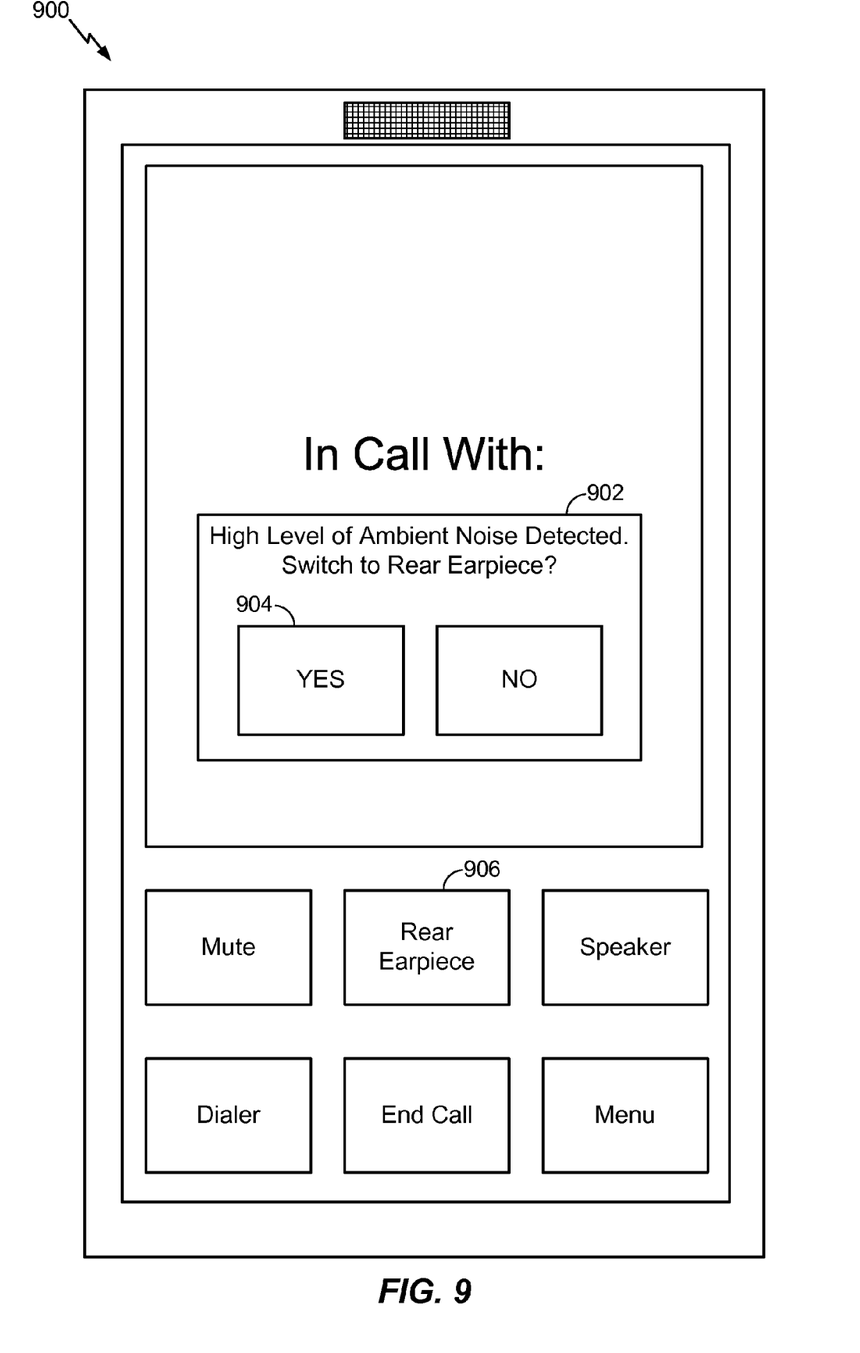
FIG. 9 shows another GUI that may be displayed by the mobile device of FIG. 1.

The method 700 further includes, based on detected input, ceasing output of sound via the first earpiece and outputting sound via a second earpiece (e.g., by changing to which earpiece sound is routed) accessible via a second side of the housing, at 704. For example, the processor 108 may receive, from the gyroscope 118, the accelerometer 120, the front facing IR sensor 114, the front facing camera 116, the rear facing IR sensor 115, the rear facing camera 117, or a combination thereof, input, such as data indicating a change in orientation (e.g., a rotation) of the mobile device. Alternatively, the processor 108 may receive input from the GUI 800 or the GUI 900, indicating a selection of an option to switch output of sound from the front facing earpiece 104 to the rear facing earpiece 106 (e.g., by generating an instruction to toggle a hardware or a software switch that controls audio output).

In response to the input, the processor 108 may stop outputting sound via the front facing earpiece 104 (e.g., the first earpiece) and begin outputting sound via the rear facing earpiece 106 (e.g., the second earpiece). The rear facing earpiece 106 is accessible via a second aperture 107 located substantially in the center of the second side of the housing 102. The second side of the housing 102 is opposite the first side of the housing 102. In some embodiments, a portion of the housing 102 surrounding the second aperture 107 may be formed to fit a particular user's ear (e.g., by using three-dimensional scanning and/or printing technology).

The method of FIG. 7 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the method of FIG. 7 can be performed by a processor that executes instructions, as described with respect to FIG. 10.

Referring to FIG. 8, a GUI 800 that enables control of an apparatus with improved audio fidelity in loud environments is shown. The GUI 800 may be displayed, for example, by the mobile device 100. In the illustrated example, the GUI 800 includes a "Rear Earpiece" button (e.g., touchscreen button) 802. Upon detecting a selection of the button 802, or a rotation of the mobile device as explained above, the mobile device may cease outputting sound via a front earpiece and begin outputting sound via a rear earpiece. Thus, the GUI 800 may enable switching to a second earpiece. The GUI 800 further includes a "Speaker" button (e.g., a touchscreen button) 804. Upon detecting a selection of the button 804, the mobile device may cease outputting via one of the earpieces and begin outputting sound via a separate loud speaker in a "speaker phone" use mode.

Referring to FIG. 9, another GUI 900 that enables control of an apparatus with improved audio fidelity in loud environments is shown. The GUI 900 may be displayed, for example, by the mobile device 100. In the illustrated example, the GUI 900 displays a prompt 902 that informs a user that a high level of ambient noise has been detected and asks the user if he or she would like to switch to using a rear earpiece. The prompt 902 may be displayed by a mobile device in response to detecting a loud environment (e.g., via one or more microphones, such as microphones of the mobile device 100 of FIG. 1). For example, the prompt 902 may be displayed based on a degree of loudness of environmental/ambient sound exceeding a threshold. In some examples, the mobile device may be configured to distinguish between the environmental/ambient sound speech of the user (e.g., using voice recognition techniques, direction of arrival techniques, etc.). The prompt 902 may include a "yes" option 904. The GUI 900 further includes a rear earpiece button 906. A mobile device (e.g., the mobile device 100) displaying the GUI 900 may switch from outputting sound via a front earpiece to outputting sound via a rear earpiece in response to receiving a selection of the option 904, in response to receiving a selection of the button 906, or in response to detecting a rotation (as described above) of the mobile device.

Figure 10:
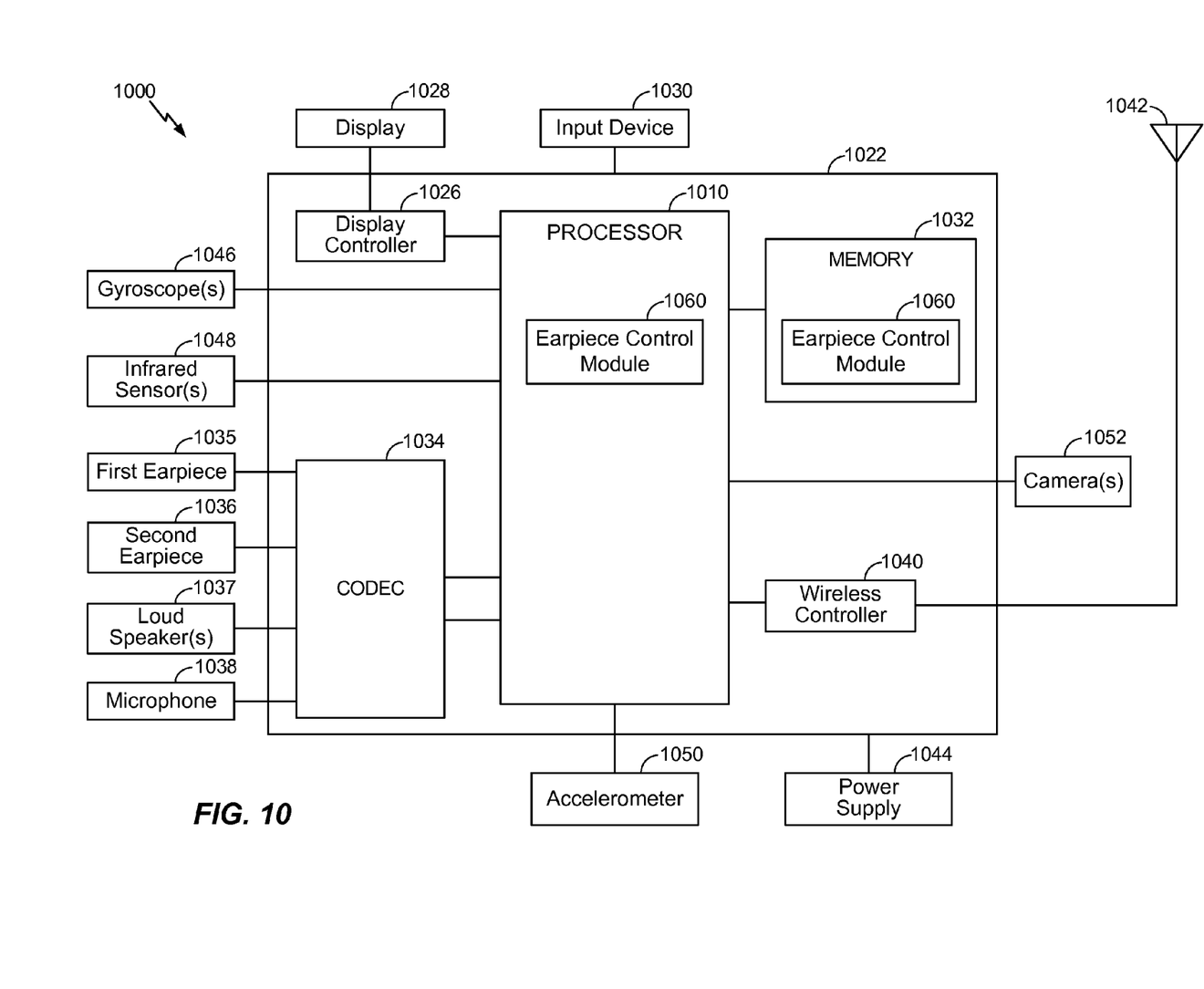
FIG. 10 is a block diagram of a wireless device supporting embodiments of the methods and apparatuses described with reference to FIGS. 1-9.

Referring to FIG. 10, a block diagram of a particular illustrative embodiment of a wireless communication device is depicted and generally designated 1000. The device 1000 includes a first earpiece 1035 and a second earpiece 1036. The first earpiece 1035 may be located in a first side of a housing of the device 1000 and may correspond to the front facing earpiece 104 of the mobile device 100. The device 1000 further includes a second earpiece 1036. The second earpiece 1036 may be located substantially in the center of a second side of the housing of the device 1000 and may correspond to the rear facing earpiece 106 of the mobile device 100. The first side of the housing may be opposite the second side of the housing. The device 1000 further includes various sensors, such as the gyroscope 1046, the infrared sensor 1048, the accelerometer 1050, and the camera 1052 that may correspond to the gyroscope 118, one or both of the IR sensors 114 and 115, the accelerometer 120, and the cameras 116 and 117, respectively. The device 1000 further includes one or more loud speakers 1037 separate from the first earpiece 1035 and the second earpiece 1036. The loud speaker 1037 may enable speaker phone functionality or may enable audio output over a greater distance than the first earpiece 1035 or the second earpiece 1036.

The device 1000 further includes a processor 1010, such as a digital signal processor (DSP) or a central processing unit (CPU), coupled to a memory 1032. The memory 1032 may store instructions corresponding to an earpiece control module 1060 that may be executed by the processor 1010. In an illustrative embodiment, the earpiece control module 1060 may correspond to the instructions stored in the memory 110 of FIG. 1 and executed by the processor 108. The earpiece control module 1060 may be executable by the processor 1010 to perform the method 700.

The memory 1032 may be a non-transient computer readable medium that stores the earpiece control module 1060 (e.g., computer-executable instructions) that are executable by the processor 1010 to cause the processor 1010 to output sound via the first earpiece 1035 and to detect a rotation of the wireless communication device 1000 (e.g., based on data received form the gyroscope 1046, the infrared sensor 1048, the accelerometer 1050, or a combination thereof). The earpiece control module 1060 is further executable by the processor 1010 to cease outputting sound via the first earpiece 1035 and to begin outputting sound via the second earpiece 1036 in response to the rotation.

FIG. 10 also shows a display controller 1026 that is coupled to the processor 1010 and to a display 1028. The display 1028 may correspond to the touchscreen display 112. A coder/decoder (CODEC) 1034 can also be coupled to the processor 1010. The first earpiece 1035, the second earpiece 1036, the loud speaker 1037, and a microphone 1038 can be coupled to the CODEC 1034.

FIG. 10 also indicates that a wireless controller 1040 can be coupled to the processor 1010 and to an antenna 1042. In a particular embodiment, the processor 1010, the display controller 1026, the memory 1032, the CODEC 1034, and the wireless controller 1040 are included in a system-in-package or system-on-chip device 1022. In a particular embodiment, an input device 1030 and a power supply 1044 are coupled to the system-on-chip device 1022. Moreover, in a particular embodiment, as illustrated in FIG. 10, the display 1028, the input device 1030, the first earpiece 1035, the second earpiece 1036, the microphone 1038, the antenna 1042, the power supply 1044, the infrared sensor 1048, the gyroscope 1046, the camera 1052, and the accelerometer 1050 are external to the system-on-chip device 1022. However, each of the display 1028, the input device 1030, the first earpiece 1035, the second earpiece 1036, the microphone 1038, the antenna 1042, the power supply 1044, the infrared sensor 1048, the gyroscope 1046, the camera 1052, and the accelerometer 1050 can be coupled to a component of the system-on-chip device 1022, such as an interface or a controller. It should be noted that the memory 1032 includes a physical device and is not a signal.

Thus, the device 1000 may enable switching between outputting sound via a first earpiece and a second earpiece. In particular embodiments, the second earpiece may be located so that the device 1000 forms a seal with a user's ear while the second earpiece is in use. Therefore, the device 1000 may enable improved audio fidelity in noisy environments.

In conjunction with the described embodiments, an apparatus is disclosed that includes a housing having a first side and a second side opposite the first side. For example, the mobile device 100 includes a housing 102 having a first side and a second side opposite the first side. The apparatus may further include first means for outputting sound, where the first means for outputting sound is accessible via a first aperture located in the first side. The first means four outputting sound may correspond to the front facing earpiece 104 accessible via the first aperture 105. The apparatus may also include a second means for outputting sound, where the second means for outputting sound is accessible via a second aperture located substantially in the center of the second side. The second means for outputting sound may correspond to the rear facing earpiece 106 accessible via the second aperture 107 located substantially in the center of the second side of the housing 102.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A mobile device comprising:
    a housing having a front side and a back side, the front side being offset from the back side in a first dimension;
    a first earpiece accessible via a first aperture in the front side of the housing;
    a second earpiece accessible via a second aperture in the back side of the housing, the second aperture being offset from the first aperture in a second dimension
    a user interface device; and
    a processor configured to, in response to a determination to switch from outputting sound via the first earpiece to outputting sound via the second earpiece, disable an unlocking capability of the user interface device.

2. The mobile device of claim 1, wherein a first distance from a first edge of the back side to the second aperture is substantially equal to a second distance from a second edge of the back side to the second aperture; a third distance from a third edge of the back side to the second aperture is substantially equal to a fourth distance from a fourth edge of the back side to the second aperture; the first edge is opposite the second edge; and the third edge is opposite the fourth edge.

3. The mobile device of claim 1, further comprising a sensor, wherein the processor is configured to determine whether to switch from outputting sound via the first earpiece to outputting sound via the second earpiece based on user input or data received from the sensor.

4. The mobile device of claim 1, wherein the second aperture is located substantially in the center of the back side, and further comprising a second ear placement region defined in the back side around the second aperture, wherein the second ear placement region is configured to contact a portion of an ear of a user.

5. The mobile device of claim 1, further comprising a loud speaker, the loud speaker distinct from the first earpiece and the second earpiece, wherein the loud speaker is configured to enable audio output over a greater distance as compared to the first earpiece and as compared to the second earpiece.

6. A mobile device comprising:
    a housing;
    a first earpiece;
    a second earpiece;
    a user interface device;
    a loud speaker distinct from the first earpiece and the second earpiece; and
    a processor configured to:
        disable an unlocking capability of the user interface device in response to a determination to switch from outputting sound via the first earpiece to outputting sound via the second earpiece while operating in a first mode; and
        enable the loud speaker to provide an output while operating in a second mode.

7. The mobile device of claim 6, wherein the determination to switch from outputting the sound via the first earpiece to outputting the sound via the second earpiece is based on user input or data received from a sensor.

8. The mobile device of claim 1, wherein the user interface device comprises a touchscreen display, and wherein the processor is configured to lock the touchscreen display based on data from a sensor.

9. The mobile device of claim 8, wherein the first earpiece is located on a periphery of the housing to accommodate the touchscreen display, and wherein the user interface device is distinct from the first earpiece and the second earpiece.

10. The mobile device of claim 1, wherein the processor is further configured to enable a second unlocking capability of the user interface device, the second unlocking capability associated with a second input pattern having a higher degree of complexity than a first input pattern associated with the unlocking capability.

11. The mobile device of claim 10, wherein the unlocking capability is associated with a first input pattern, and wherein a degree of complexity of the first input pattern is based on a number of touches, a number of direction changes, or a combination thereof, to be detected in the first input pattern.

12. The mobile device of claim 6, wherein the unlocking capability corresponds to an input pattern at least a portion of which is detectable via the user interface device, and wherein the processor is further configured to enable a second unlocking capability of the user interface device, the second unlocking capability associated with a second input pattern having a higher degree of complexity than a first input pattern associated with the unlocking capability.

13. A method of operating a mobile device, the method comprising:
    in a first mode of operation, disabling an unlocking feature of a user interface of the mobile device in response to a determination to switch from outputting, at the mobile device, sound via a first earpiece to outputting sound via a second earpiece; and
    in a second mode of operation, generating an output, at the mobile device, via a loud speaker, wherein the loud speaker is distinct from the first earpiece and the second earpiece.

14. The method of claim 13, wherein the determination to switch from outputting sound via the first earpiece to outputting sound via the second earpiece is based on user input.

15. The method of claim 13, further comprising:
receiving input at a microphone of the mobile device;
determining, based on the input, that the mobile device is in a loud environment; and
generating a message to be displayed at a display of the mobile device, wherein the message prompts a user to provide user input.

16. The method of claim 13, wherein the determination to switch from outputting sound via the first earpiece to outputting sound via the second earpiece is based on detecting rotation of the mobile device.

17. The method of claim 16, wherein the rotation is detected based on data from a gyroscope of the mobile device.

18. The method of claim 16, wherein the rotation is detected based on data from a proximity sensor of the mobile device.

19. The method of claim 16, wherein the rotation is detected based on data from one or more cameras of the mobile device.

20. The method of claim 16, wherein detecting the rotation includes detecting rotation of the mobile device about an axis of the mobile device.

21. The method of claim 20, wherein detecting the rotation includes detecting rotation of the mobile device about the axis and a second axis of the mobile device.

22. The method of claim 21, wherein detecting the rotation about the axis and the second axis includes receiving data from an accelerometer, from a gyroscope, or from a combination thereof.

23. The method of claim 13, further comprising disabling a proximity sensor of the mobile device in response to the determination to switch from outputting sound via the first earpiece to outputting sound via the second earpiece.

24. The method of claim 23, wherein the proximity sensor is configured to detect a proximity of the first earpiece to another object.

25. The method of claim 13, further comprising updating a state associated with the mobile device in response to the determination to switch from outputting sound via the first earpiece to outputting sound via the second earpiece, wherein the state is stored in a memory of the mobile device and the state indicates an orientation of the mobile device.

26. The method of claim 25, wherein the state indicates which side of a housing is facing a user of the mobile device.

27. A computer readable storage device storing instructions that, when executed by a processor, cause the processor to perform operations including:
in a first mode of operation, disabling an unlocking capability of a user interface of a mobile device in response to a determination to switch from outputting, at a mobile device, sound via a first earpiece to outputting sound via a second earpiece; and
in a second mode of operation, generating an output, via a loud speaker, wherein the loud speaker is distinct from the first earpiece and the second earpiece.

28. The computer readable storage device of claim 27, wherein the user interface corresponds to a touchscreen display, and wherein the operations further include locking the touchscreen display in response to the determination to switch from outputting sound via the first earpiece to outputting sound via the second earpiece.

29. The computer readable storage device of claim 28, wherein the operations further include, in response to the determination to switch from outputting sound via the first earpiece to outputting sound via the second earpiece, enabling recognition of a second unlocking capability of the user interface, and wherein the user interface is in a locked state during disabling of the unlocking capability.

* * * * *